Figure 5:
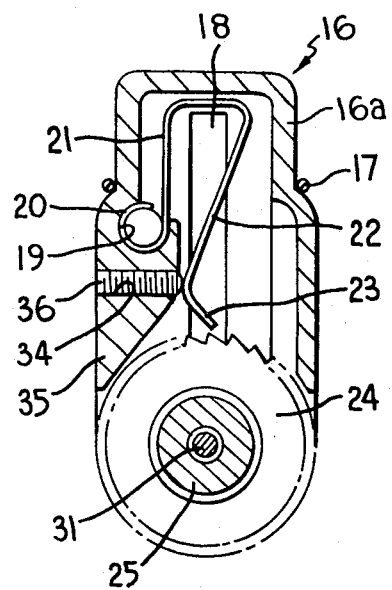

United States Patent [19]
Toplis

[11] 3,759,352
[45] Sept. 18, 1973

[54] CYCLE BRAKE HAVING BRAKE ADJUSTING MECHANISM
[75] Inventor: John Geoffrey Toplis, Beeston, Nottinghamshire, England
[73] Assignee: Raleigh Industries Limited, Nottingham, England
[22] Filed: May 12, 1971
[21] Appl. No.: 142,543

[52] U.S. Cl. ............... 188/24, 74/489, 188/196 BA
[51] Int. Cl. ............................................. B62l 3/02
[58] Field of Search ..................... 74/488, 489, 501, 74/524, 525, 538; 188/24, 26, 196 BA

[56] References Cited
UNITED STATES PATENTS
3,199,640  8/1965  Thompson .................... 188/196 BA FOREIGN PATENTS OR APPLICATIONS
900,645  10/1944  France ............................... 74/489

Primary Examiner—Duane A. Reger
Attorney—Salter & Michaelson

[57] ABSTRACT

A cycle brake for applying a braking action to the wheel of a cycle through a flexible cable and having an adjustable support for the cable sheath that is automatically movable to compensate for wear of the cycle brake elements upon pivotal movement of a brake lever beyond a predetermined point during a braking action.

9 Claims, 5 Drawing Figures

Patented Sept. 18, 1973
3,759,352
3 Sheets-Sheet 1
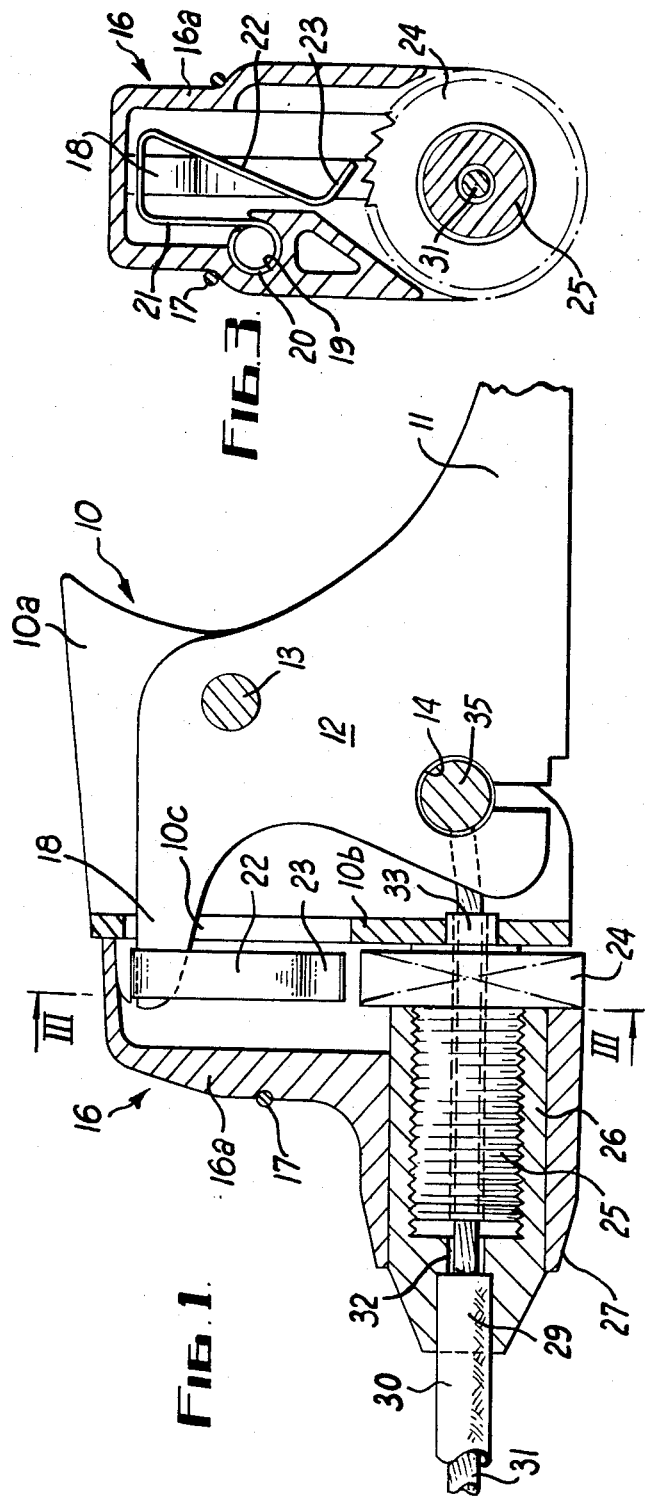
INVENTOR:
JOHN GEOFFREY TOPLIS
BY
Salter + Michaelson
ATTORNEYS

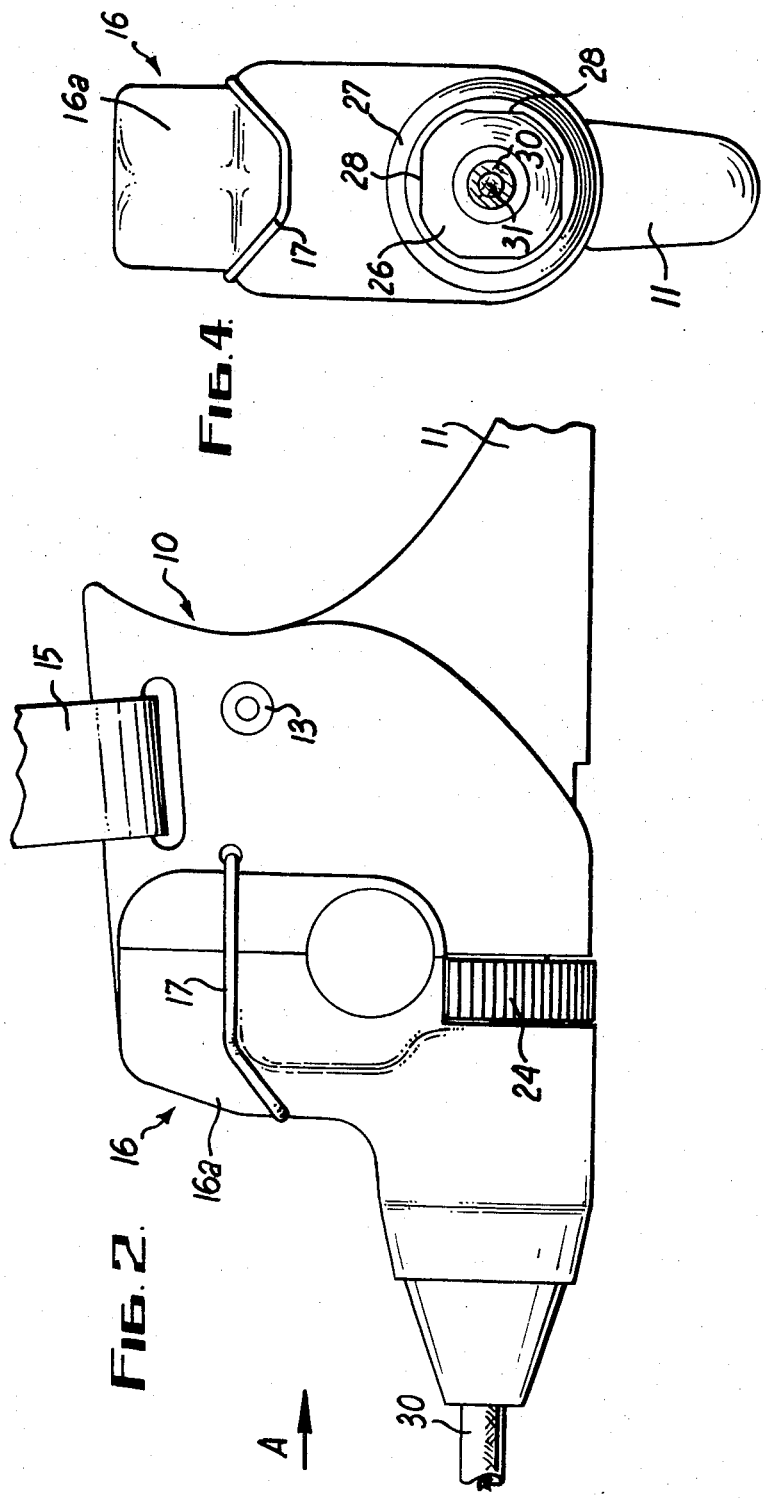

CYCLE BRAKE HAVING BRAKE ADJUSTING MECHANISM

This invention concerns brakes and in particular brakes for use with cycles, tricycles, mopeds, motor cycles, and the like wheeled conveyance (such brakes being herein generally referred to as "cycle brakes").

The object of the present invention is to provide a cycle brake in which means are provided for automatic self adjustment of the brake to compensate for wear in the brake blocks, pads or shoes during use.

A further object is to provide a brake which is capable of being rapidly and easily adjusted manually in addition to the automatic self adjustment achieved during use.

According to the present invention a cycle brake is characterised in that there is provided a positionally adjustable support for a brake cable sheath, said support being provided with an adjuster screw adapted to index said support and spring means co-operating with a brake operating lever adapted, upon pivotal movement of the lever over a distance greater than a predetermined arc, to index said adjuster screw and then said support to adjust the brake.

Conveniently the resilient means is in the form of a leaf spring and the adjuster screw is provided with a head having ratchet teeth on its periphery said spring being caused to contact a tooth and index the adjuster screw when movement of the lever over more than predetermined arc takes place.

Preferably the adjuster screw is manually rotatable independently of the spring to enable rapid relatively large brake adjustments to be made.

The invention will be described further, by way of example with reference to the drawings accompanying the specification showing one practical form of the invention and in which:

FIG. 1 is a part sectional side elevation of part of a cycle brake embodying the invention;
FIG. 2 is a side elevation of the brake part of FIG. 1;
FIG. 3 is a section on the line III—III of FIG. 1, and
FIG. 4 is a view in the direction of the arrow A of FIG. 2, and
FIG. 5 which illustrates a modification of the basic invention, illustrated in FIGS. 1 to 4.

Referring now to FIGS. 1 to 4 of the drawings it will be seen that there is provided a fulcrum bracket 10, adapted between its side walls 10a to receive a brake lever 11. The lever 11 is provided with a head portion 12 through which passes a pivot pin or rivet 13 which latter is carried by the side walls 10a of the fulcrum bracket 10.

The head portion 12 is provided with a cable nipple receiving aperture 14 in the normal manner. The cable nipple receiving aperture 14 is located substantially at the forward end of the head portion 12 relative to the lever 11. A clamping strap 15 or the like is provided on the fulcrum bracket 10 to enable the latter to be secured to a cycle handlebar (not shown).

Adapted to be secured to the fulcrum bracket 10 at its face remote from the lever 11 is a shroud 16 within which is located the adjustment means yet to be described. The shroud is retained in position by a spring clip 17 pivotally mounted on the fulcrum bracket 10 and adapted, in the operative position shown to embrace the body 16a of the shroud. The brake lever head portion 12 is provided, at a position remote from the brake cable nipple receiving aperture 14, with a projection 18 which extends into the body 16a of the shroud 16 through an aperture 10c in the fulcrum bracket 10. Within the body 16a of the shroud 16 is a spring receiving recess 19 (see FIG. 3) within which is located a rolled end 20 of a leaf spring 21 which latter has a portion overlying the projection 18 of the brake lever head portion 12. The spring 21 extends over the projection 18 and is provided with an angularly disposed projection abutting portion 22 which terminates in a ratchet screw operating tongue 23 normally located just clear of a ratchet screw head 24.

The ratchet screw head 24 is integrally formed with a hollow ratchet screw 25 whose external periphery is threaded to mate with a corresponding thread formed on the internal periphery of a hollow adjuster nut 26 which is slidable in a housing 27 integral with the shroud body 16 and projecting forwardly therefrom relative to the fulcrum bracket 10.

The nut 26 is non-rotatable in the housing 27, there being flats 28 on the external periphery of the nut and corresponding flats on the internal wall of the housing 27 (see FIG. 4). The forward end of the nut 26 is bored to receive the end 29 of a brake cable sheath 30 the cable 31 of which passes through a reduced diameter bore 32 in the nut 26, through the hollow screw 25, the head 24 (a locating spigot 33 being formed thereon and located in a recess in the fulcrum bracket wall 10b) and at its end is provided with the usual nipple 35 located in the nipple receiving aperture 14 of the head portion 12 of the lever 11.

In operation, assuming that the brake cable is used to operate a caliper brake the blocks of which are operative on a cycle wheel rim the brake lever 11 is pulled towards the handlebars (not shown) to apply the brakes. As wear on the blocks occurs the brake lever movement to apply the brakes must increase, Initially movement of the lever will cause the projection 18 on the head 12 to move towards the ratchet screw head 24 and thus move the spring portion 22 downwardly to cause the operating tongue 23 merely to abut a ratchet tooth on the ratchet screw head 24. When wear has occurred in the brake blocks and greater lever movement is required the spring will be moved such a distance as to cause the operating tongue to index the screw head and thus rotate the screw 25 abd cause slack in the cable 31 to be taken up by moving the nut 26 outwardly of the housing 27 thus adjusting the brake. After adjustment as described the brake will operate in the normal way until further compensation for wear is required, whereupon the ratchet screw head will again be indexed.

When it is desired to replace the brake blocks the ratchet screw head is rotated in the reverse direction to that of indexing until the nut 26 is fully retracted into the housing 27. When the new blocks have been fitted initial brake adjustment is made by rotating the ratchet screw head 24 in the direction of indexing until the brakes can be applied by movement of the lever 11 through a distance less than that required to cause indexing of the ratchet screw head 24.

In a preferred form of construction the ratchet screw head is so designed as to give approximately 0.040 inch of cable adjustment per revolution and the compensatory adjustment by indexing is arranged to provide approximately 0.0015 inch of cable adjustment for each indexing operation which will be more than sufficient to compensate for normal wear in the brake blocks.

In the modification shown in FIG. 5 (upon which parts identical to those of FIGS. 1 to 4 have been marked with reference numerals identical to those of FIGS. 1 to 4) only the modification will be referred to. Thus as shown on FIG. 5 there is provided a tapped hole 34 in a wall 35 of the shroud body 16a at a position adjacent the rolled end 20 of the spring 21. Within the hole 34 is located a grub screw 36 whose inner end projects into the body 16a to contact the spring 21 adjacent the tongue 23. The purpose of the grub screw 36 is to allow the position of the tongue 23 to be altered relative to the teeth of the ratchet screw head 24 should it be found that the brake is operating in a "spongy" manner, that is if considerable lever movement is required to obtain full braking efficiency. Under the circumstances the indexing arrangement may (without provision of the grub screw 36) tend to cause indexing to take place too quickly. The grub screw allows of the avoidance of such quick indexing by making it possible to push the tongue 23 towards the wall 16a away from the wall part 35 in order that indexing action is delayed.

The invention is not restricted to use with caliper brakes operating on a wheel rim and clearly the adjustment means can be used with hub brakes including expanding brake shoes or interleaved plates or a brake utilizing discs and pads.

What we claim is:

1. A cycle brake for applying a braking action to the wheel of a cycle through a flexible cable, wherein said cable is enclosed in a sheath, comprising a housing, a support for said sheath mounted in said housing for longitudinal movement therein, an adjuster screw operatively engaging said support for imparting the longitudinal movement thereto, means for rotating said adjuster screw including a ratchet wheel engaging said adjuster screw and a leaf spring pivotally mounted in said housing and engageable with said ratchet wheel for producing a rotating movement thereof, and a brake operating lever pivotally mounted on said housing and engaging said cable for imparting a braking action thereto in operation of said brake, said lever further operatively engaging said leaf spring for urging said leaf spring toward said ratchet wheel, wherein said leaf spring is engageable with said ratchet wheel to produce the rotating movement thereof and the longitudinal adjusting movement of said sheath support when the lever is pivotally movable beyond a predetermined point during a braking operation.

2. A cycle brake as claimed in claim 1, said leaf spring normally abutting said ratchet wheel and being deformed by said brake lever upon movement of said brake lever beyond the predetermined point, wherein said leaf spring positively engages the ratchet wheel for producing the adjustable rotating movement.

3. A cycle brake as claimed in claim 2, a portion of said adjuster screw being accessible externally of said housing for manual rotation of said adjuster screw independently of said leaf spring, thereby providing for immediate brake adjustment irrespective of the movement of said brake lever.

4. A cycle brake as claimed in claim 1, said support for said sheath being internally threaded and operatively engaging said adjuster screw in threaded relation, wherein rotation of said adjuster screw produces a longitudinal movement of said sheath support.

5. A cycle brake as claimed in claim 4, said sheath support having a central aperture formed therein for receiving an end of the cable sheath, and an opening communicating with said aperture through which said cable extends.

6. A cycle brake as claimed in claim 1, said housing including a bracket for attachment to a cycle and a shroud mounted on said bracket, a resilient clip engaging said shroud for the mounting thereof on said bracket, said lever being pivotally mounted on said bracket, and means on said lever for removably attaching an end of said cable thereto.

7. A cycle brake as claimed in claim 1, said lever having a projection formed thereon that overlies a portion of said leaf spring, said projection being movable upon pivotal movement of said lever to force said leaf spring toward said ratchet wheel and into positive contact with said ratchet wheel when the lever is pivotal beyond the predetermined point.

8. A cycle brake as claimed in claim 7, means in said housing for adjusting the position of said leaf spring relative to the ratchet wheel, thereby adjusting the distance required for movement by the brake operating lever before engagement of the spring with the ratchet wheel.

9. A cycle brake as claimed in claim 8, said means for adjusting the position of the leaf spring including a screw that is adjustably mounted in said housing and is located in abutting relation with said spring.

* * * * *